Aug. 21, 1951 R. M. BAKER 2,565,113

RADIO FREQUENCY OSCILLATOR

Filed Dec. 17, 1948

WITNESSES:
Robert C. Baird
Nev. C. Groome

INVENTOR
Robert M. Baker.
BY F. E. Browder
ATTORNEY

Patented Aug. 21, 1951

2,565,113

UNITED STATES PATENT OFFICE 2,565,113

RADIO FREQUENCY OSCILLATOR

Robert M. Baker, Catonsville, Md., assignor to Westinghouse Electric Corporation, East Pittsburgh, Pa., a corporation of Pennsylvania Application December 17, 1948, Serial No. 65,923

19 Claims. (Cl. 250—36)

This invention relates to radio frequency oscillators and relates more particularly to tank circuits for such oscillators.

High frequency oscillators used in industrial heating are often required to supply power to loads having low power factors. This requires, for satisfactory operation, that the tank circuits of such oscillators have high ratios of kilovolt-amperes to kilowatts in their tank circuits under load conditions. This invention provides a tank circuit for a high frequency oscillator which meets this requirement and which will operate at a relatively high efficiency.

In one embodiment of the invention, the components of the tank circuit are enclosed in a grounded, outer enclosure having one closed and one partially open end. The tank inductor is a metal tube with one end connected to the closed end of the enclosure, and its other end connected to an inner enclosure, the tube and the inner enclosure extending longitudinally of the outer enclosure and coaxial therewith. The capacity between the walls of the inner and outer enclosures form the main tank tuning capacity of the oscillator. The inner enclosure has spaced capacitor plates which are meshed with corresponding plates connected through the partially open end of the outer enclosure to the anode of the oscillator tube, and which form the anode blocking capacity. The outer enclosure has a metal extension forming a shield which extends partially across its open end. This extension is connected to, and supports, a grid bypass capacitor. A metal strap, forming the grid inductance connects the grid bypass capacitor to the grid of the oscillator tube.

In another embodiment of the invention, the components of the tank circuit are enclosed in a grounded, outer enclosure but the inner end of the coaxial tube forming the tank inductor, supports a transversely extending plate which is spaced from a similar plate connected to the anode of the oscillator tube. A plurality of ceramic capacitors are supported between and connected to the plates and form the anode blocking capacity. The main tank tuning capacity is formed by a capacitor connected to the inner end of the tank, or the tube forming the tank inductor, and to the inner surface of the outer enclosure.

An object of the invention is to improve the tank circuits of radio frequency generators.

A more definite object of the invention is to provide a tank circuit for a radio frequency generator which will deliver a high ratio of kilovolt-amperes to kilowatts, to a low power factor load, at relatively high efficiency.

The invention will now be described with reference to the drawing of which:

Figure 1:
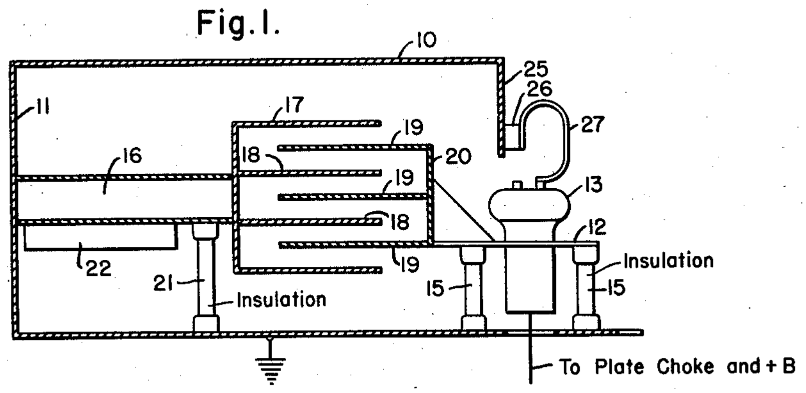
Figure 1 is a side elevation, partially in section, of tank circuit components embodying this invention, connected to an oscillator tube.

Referring first to Fig. 1, the grounded, rectangular, metal, outer enclosure 10 has one end 11 substantially closed and has its other end partially open for the extension thereinto of the anode supporting shelf 12 for the oscillator tube 13, which is a conventional water cooled tube having its anode formed as a water jacket for cooling purposes. The shelf 12 is supported from the outer enclosure 10 by the insulators 15. Two or more tubes 13 may be used. External anode type air-cooled tubes may be used, if desired.

The tank inductor 16 is a rectangular metal tube attached at one end to the closed end 11 of the outer enclosure 10, and attached at its other end to the rectangular metal inner enclosure 17, the sides of which extend parallel the sides of the outer enclosure 10. The inner enclosure 17 has the inner spaced metal plates 18 which mesh together with the corresponding plates 19 which are attached to the end plate 20, which in turn, is attached to, and supported from, the anode supporting shelf 12. The plates 19 and 20 may be separately supported on insulators and connected to the anode supporting plate 12 by a wide flexible copper strap. The inner end of the inductor 16 and the inner enclosure 17 are supported by the insulator 21 from the lower wall of the outer enclosure 10.

The inductor 16 has the metal flaps 22 connected by the hinges 23 to its lower sides. The flaps can be adjusted about the hinges for varying the inductance of the tank circuit, and thereby varying the frequency of the oscillator.

The main tank tuning capacity is provided by the capacity between the walls of the inner enclosure 17 and the walls of the outer enclosure 10. The capacity between the plates 18 of the inner enclosure and its sides, and the plates 19, form the tank blocking capacity. The outer enclosure 10 at its partially open end has the metal extension 25 which forms a shield partially closing off its open end through which the shelf 12 extends, and which has electrically and mechanically attached thereto, the grid bypass capacitor 26, which in turn, is connected by the metal strap 27 to the control grid of the tube 17. The strap 27 forms the grid inductor of the tube. The cathode leads to the oscillator tube are connected to bypass capacitors also located on the extension 25.

Figure 4:
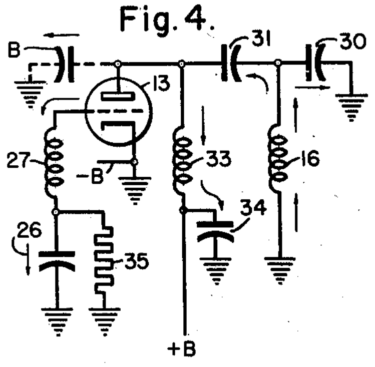
Fig. 4 is a circuit schematic illustrating a circuit of an oscillator with which the tank circuit components of Figs. 1 and 2 may be used.

Fig. 4 illustrates the circuit of the oscillator, the capacitor 30 being the main tuning capacity formed between the sides of the inner and outer enclosures, the capacitor 31 being the tank blocking capacitor formed by the capacity between the plates 18 and the sides of the inner enclosure 17, and the plates 19, the inductor 16 being the described tank inductor, the capacitor 26 being the described grid bypass capacitor, and the inductor 27 being the described grid inductor. The other circuit components are the anode choke 33 which connects the anode of the oscillator tube 13 to the positive terminal of a conventional plate supply source which is not illustrated, and the negative terminal of which is connected to the cathode of the tube 13 and ground. The capacitor 34 is the plate bypass capacitor, and the resistor 35 is the grid resistor across which the capacitor 26 is shunted.

The flow of radio frequency currents through the circuit is illustrated by the arrows of Fig. 4. The radio frequency currents flowing through the grid circuit and through the external anode capacitor 34 to ground, through the circuit illustrated by the dotted capacitor B, flow through the outer enclosure and add to the current in the tank inductor and this increases the total kilovolt-amperes. These additional currents flowing through the blocking capacitor 31 cause the radio frequency voltage across the tank inductor 16 and the main tank capacitor 30 to be greater than the radio frequency voltage at the anode of the tube 13. The amount of the build up is regulated by the value of the capacitor 31, and should preferably not be more than 50% of the anode voltage.

In an installation using this invention and designed to supply 20 kilowatts of power to a load at a frequency of 27.3 megacycles, 24 kilowatts of power were supplied to the load with a power factor of 0.8% at an efficiency of 58%. This corresponds to a kilovolt-ampere to kilowatt ratio of 125:1.

The value of the tank inductor 16 should preferably be so selected that at full anode voltage, the radio frequency kilovolt-amperes in the inductor is at least equal to the maximum load kilovolt-amperes which the generator is expected to supply.

Since the tank inductor for a 20 kilowatt oscillator may at times carry from 400 to 500 amperes, it should have relatively large dimensions. For example, suitable dimensions may be six inches square by twenty inches long.

The capacity of the main tank tuning capacitor 30 should be such that this capacity in conjunction with the effective shunting capacity of the remainder of the circuit, is just sufficient to resonate the tank inductor at the desired oscillation frequency.

The reactance of the inductor 27 should preferably be from $1/5$ to $1/7$ the internal grid to anode capacitive reactance of the tube. The reactance of the grid bypass capacitor 26 should preferably be small in comparison to the reactance of the grid inductor 27. The anode choke 33 and the anode bypass capacitor 34 are of standard design for high frequency circuits.

As previously mentioned, the flaps 22 may be adjusted for varying the frequency of oscillation.

Figure 2:
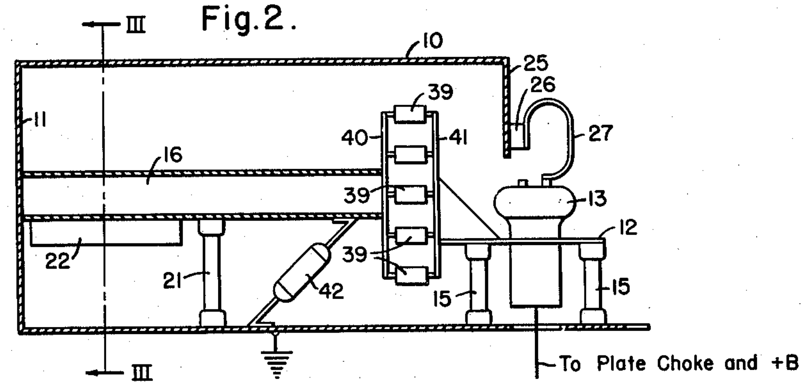
Fig. 2 is a view similar to Fig. 1 but illustrating another embodiment of the invention.
Figure 3:
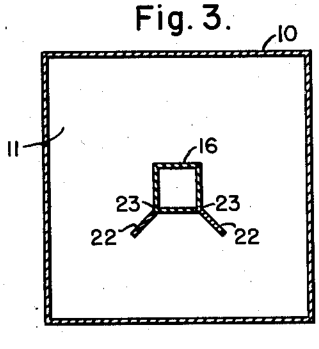
Fig. 3 is a sectional view along the lines III—III of Figs. 1 and 2.

The embodiment of the invention illustrated by Fig. 2 is similar to that of Fig. 1, except that the anode blocking capacity is provided by the ceramic capacitor 39 connected between the transversely extending, parallel, rectangular, metal plates 40 and 41, the plate 41 being attached to the anode supporting shelf 12, and the plate 40 being attached to the inner end of the tank inductor 16. Another difference is that the main tank tuning capacity is provided by the tubular capacitor 42 connected to the inner end of the tank inductor 16, and to the inner surface of the outer enclosure 10. The operation of the components of the embodiment of Fig. 2 is similar to the corresponding components of Fig. 1.

Power may be drawn from the tank circuit with any one of the various conventional couplings.

I claim as my invention:

1. A tank circuit for a high frequency oscillator tube having an anode, comprising an inner and an outer conductor, said inner conductor being connected at one end to one end of said outer conductor; an anode blocking capacitor in said outer conductor and connected to the other end of said inner conductor, and means extending through an opening in the other end of said outer conductor and connecting said capacitor to said anode.

2. A tank circuit as claimed in claim 1 in which the tube has an outer anode, and in which the means for connecting the capacitor to the anode is a metal anode support extending through the opening.

3. A tank circuit as claimed in claim 1 in which the capacitor includes spaced plates attached to the other end of the inner conductor and extending towards the other end of the outer conductor, and includes spaced plates meshing with said plates and connected to the anode.

4. A tank circuit as claimed in claim 1 in which a transversely extending plate is connected to the other end of the inner conductor, and in which a transversely extending plate is connected to said anode, and in which the capacitor is attached to, and supported between, said plates.

5. A tank circuit for a high frequency oscillator tube having an outer anode, comprising an outer conductor having an open and a closed end, an inner conductor connected at one end to said closed end of said outer conductor, spaced plates attached to the other end of said inner conductor and extending toward the open end of said outer conductor, a metal anode support attached to said anode and extending through said opening into said outer conductor, and spaced plates meshing with said plates and attached to said support.

6. A tank circuit for a high frequency oscillator tube having an external anode, comprising an outer conductor having an open and a closed end; an inner conductor, said inner conductor being connected at one end to said closed end of said outer conductor, a transversely extending plate connected to the other end of said inner conductor, a metal support attached to said anode and extending through said open end of said outer conductor thereinto, a transversely extending plate attached to said support, a plurality of anode blocking capacitors connected to, and supported between, said plates, and a tank tuning capacitor in said outer conductor and connected to same and to said inner conductor.

7. A tank circuit for a high frequency oscillator tube having an anode, comprising a metal outer enclosure forming an outer conductor, a metal tube forming an inner conductor attached at one end to one end of said enclosure, an inner enclosure attached to the other end of said tube, said inner enclosure having first spaced plates therein, second spaced plates meshing with said first plates and a conductor connecting said second spaced plates to said anode, the capacity between said inner and outer enclosures forming the main tank tuning capacity of said circuit.

8. A tank circuit for a high frequency oscillator tube having an external anode, comprising a metal outer enclosure having a closed and an open end and forming an outer conductor, a metal tube forming an inner conductor attached at one end to said closed end of said enclosure, an inner enclosure attached to the other end of said tube, said inner enclosure having spaced plates therein, an anode support attached to said anode and extending through said open end of said enclosure into said enclosure, and spaced plates meshing with said plates and attached to said support, the capacity between said inner and outer enclosures forming the main tank tuning capacity of said circuit.

9. A tank circuit for a high frequency oscillator tube having a grid and an anode, comprising an inner and an outer conductor, said outer conductor having a closed and an open end, said inner conductor being connected at one end to said closed end of said outer conductor, a capacitor in said outer conductor and connected to said outer end of said inner conductor, means extending through said open end of said outer conductor and connecting said capacitor to said anode, said outer conductor at said open end having an extension partially closing the opening in said open end, a grid bypass capacitor connected to said extension, and a grid inductor connected to said grid and to said grid capacitor.

10. A tank circuit as claimed in claim 9 in which said anode of said tube is an external anode, and said means is a metal support for said anode.

11. A tank circuit as claimed in claim 9 in which the first mentioned capacitor includes spaced plates extending from said other end of said inner conductor towards said open end of said outer conductor, and includes spaced plates meshing with said spaced plates and connected to said anode.

12. A tank circuit as claimed in claim 11 in which the tube anode is an external anode, and the means connecting the first mentioned capacitor to the anode is a metal support for the anode.

13. A tank circuit as claimed in claim 9 in which a transversely extending plate is attached to said other end of said inner conductor, and another transversely extending plate is connected to said anode, and said first mentioned capacitor is connected to, and supported between, said plates.

14. A tank circuit as claimed in claim 13 in which the tube anode is an external anode and the means for connecting the first mentioned capacitor to the anode is a metal support for the anode.

15. A tank circuit for a high frequency oscillator tube having a grid and an anode, comprising a metal outer enclosure having a closed and an open end and forming an outer conductor, a metal tube forming an inner conductor attached at one end to said closed end of said enclosure, an inner enclosure attached to the other end of said metal tube, said inner enclosure having spaced plates therein, spaced plates meshing with said plates, and means extending through said open end and connecting said last mentioned spaced plates to said anode, the capacity between said inner and outer enclosures forming the main tank tuning capacity of said circuit, said outer enclosure at said open end having an extension partially closing the opening therein, a grid bypass capacitor connected to said extension, and a grid inductor connected to said grid and to said grid capacitor.

16. A tank circuit as claimed in claim 15 in which the means connecting the last mentioned spaced plates to the anode is a metal support for the anode.

17. A tank circuit for a high frequency oscillator tube having a grid and an anode, comprising a metal outer enclosure having a closed and an open end and forming an outer conductor, a metal tube forming an inner conductor attached at one end to said closed end of said enclosure, a transversely extending plate attached to the other end of said metal tube, an anode support attached to said anode and extending through said open end into said enclosure, another transversely extending plate attached to said support, a plurality of anode blocking capacitors attached to, and supported between, said plates, said outer enclosure at said open end having an extension partially closing the opening therein, a grid bypass capacitor attached to said extension, a grid inductor attached to said grid and to said grid capacitor, and a main tank tuning capacitor in said outer enclosure and connected to same and to said inner enclosure.

18. A tank circuit for a high frequency oscillator tube having an anode, comprising an inner and an outer conductor, said conductors being rectangular in cross-section, said inner conductor being connected to one end of said outer conductor, an anode blocking capacitor connected to the other end of said inner conductor and to said anode, and metal flaps rotatably attached to corners of said inner conductor and extending longitudinally thereof, said flaps being rotatable about said corners of said inner conductor for varying the frequency of oscillation of said tube.

19. A tank circuit for a high frequency oscillator tube having an anode, comprising an inner and an outer conductor, said inner conductor being connected to one end of said outer conductor, an anode blocking capacitor connected to the other end of said inner conductor and to said anode, and metal flaps adjustably attached to said inner conductor and extending longitudinally thereof, said flaps being adjustable about said inner conductor for varying the frequency of oscillation of said tube.

ROBERT M. BAKER.

REFERENCES CITED

The following references are of record in the file of this patent:

UNITED STATES PATENTS

| Number | Name | Date |
|---|---|---|
| 2,147,425 | Bock | Feb. 14, 1939 |
| 2,272,211 | Kohler | Feb. 10, 1942 |
| 2,427,558 | Jensen | Sept. 16, 1947 |
| 2,472,204 | Fubini | June 7, 1949 |